Figure 1:
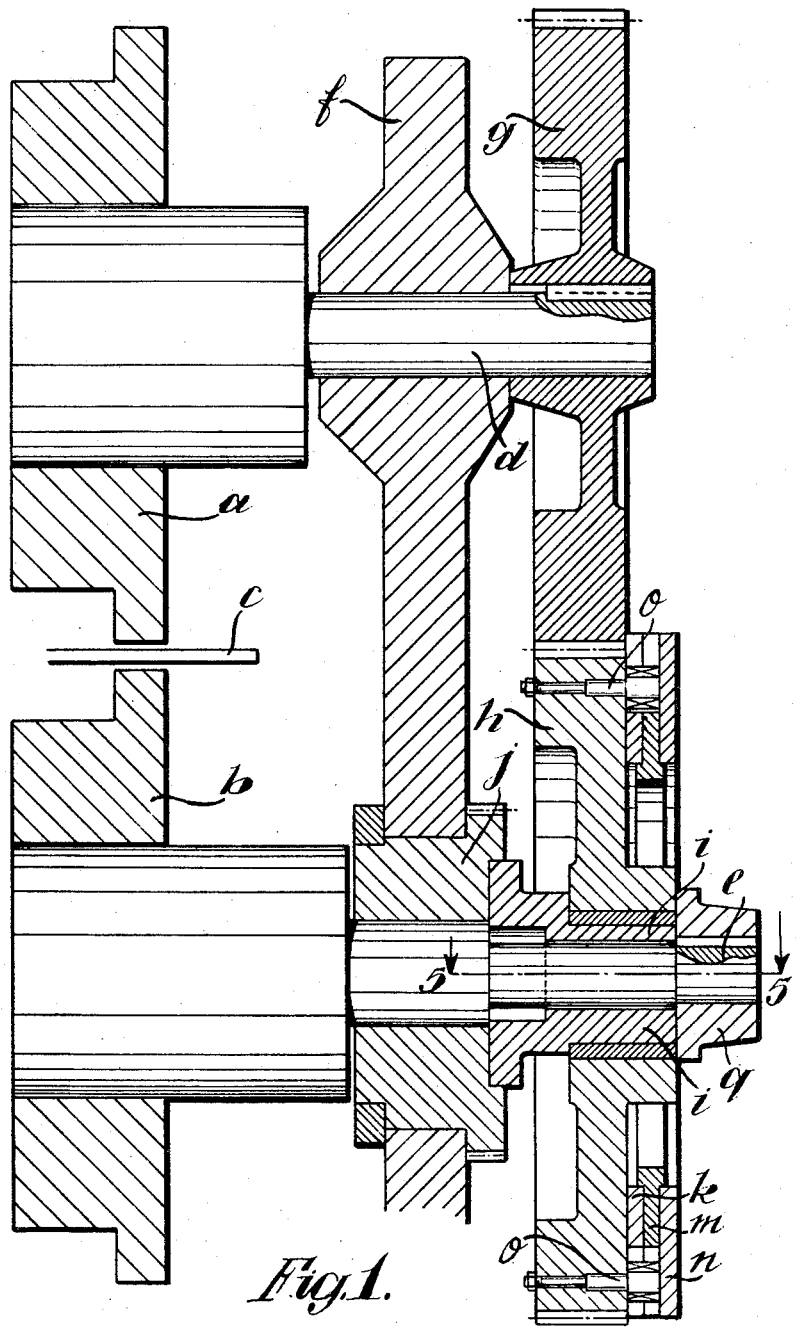

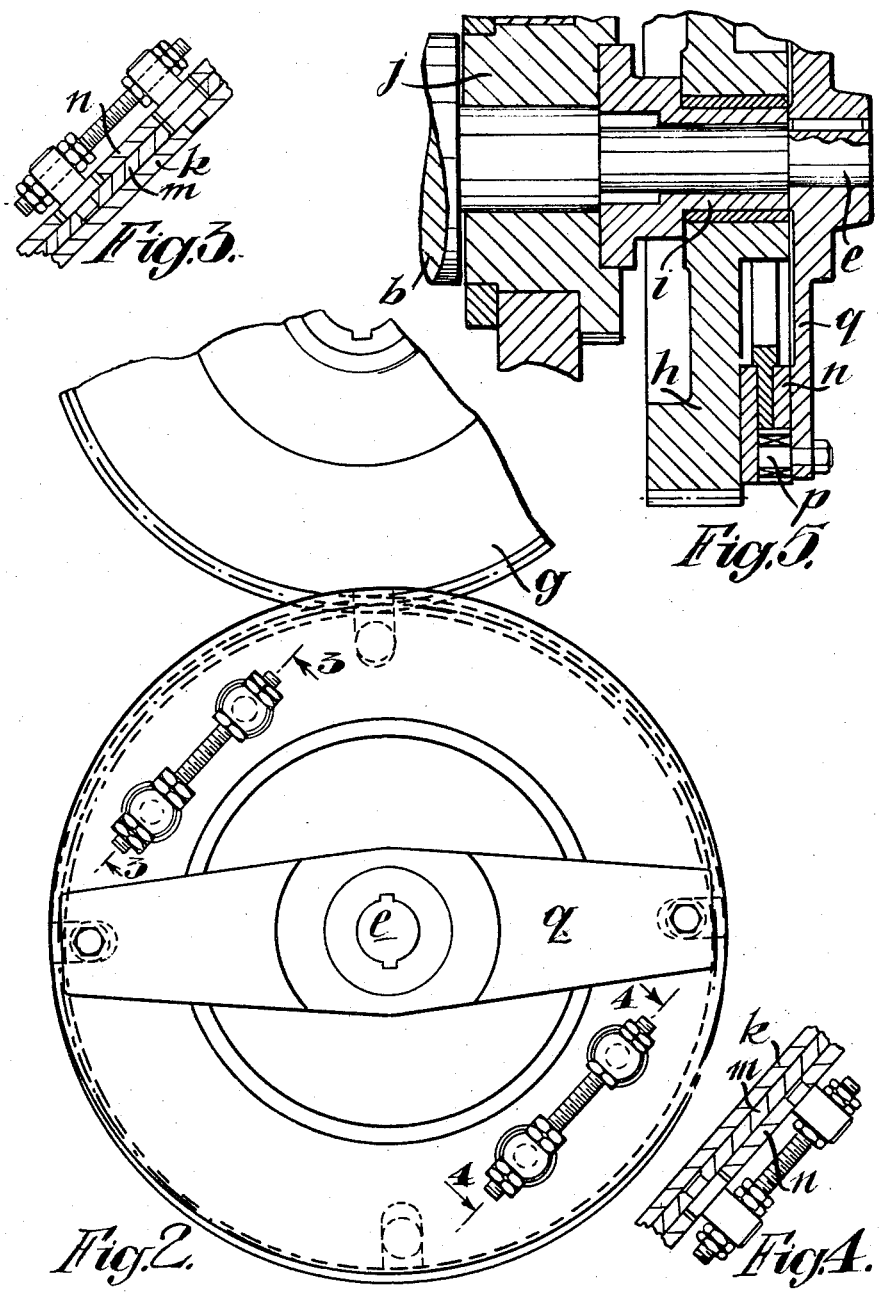

United States Patent Office 3,045,562
Patented July 24, 1962

3,045,562
BOXMAKING AND LIKE MACHINES
Harold Bromley, Cheadle Hulme, England, assignor to Henry Simon Limited, Stockport, England, a British company
Filed Aug. 4, 1961, Ser. No. 129,436
Claims priority, application Great Britain Sept. 29, 1960
1 Claim. (Cl. 93—58.2)

This invention relates to machines for making boxes and the like from corrugated cardboard, hereinafter referred to as board, and particularly to the machine units which receive prepared blanks of board and apply thereto processes of slotting, punching, or embossing, such machines usually being known as "slotters."

In the type of slotter to which this invention applies, the process of forming a slot, a shaped opening, or an embossed shape in a board is performed by passing a board blank between a pair of intermeshing rotary cutter or die elements which are mounted on parallel contra-rotating shafts whose axes are parallel to the surface of the board and at right-angles to the direction in which it is moving. The shafts are geared together so that the angular speeds of the related contra-rotating cutting or forming surfaces are the same, one of the shafts being mounted in fixed journal bearings and the other being mounted in journal bearings which are adjustable relative to the fixed journal bearings so that the intershaft spacing can be preset to accommodate any specific board thickness within the capacity limitations of the machine. In conventional slotters where the intermeshing gears are rigidly fixed to the respective shafts, this necessary adjustment feature has the disadvantage that, except in the minimum spacing position where the gear teeth are fully meshed, gaps between tooth faces permit an amount of angular backlash which, at wide intershaft spacings, may be greater than the permissible angular clearance between intermeshing rotary cutter or die elements, which circumstances would cause rapid deterioration of the cutting or embossing edges of the said elements, this disadvantage thus imposing a limitation on the range of board thicknesses which can be accommodated by the slotter.

It is known to overcome this disadvantage by providing a slotting machine or slotter of the type referred to in which there are two intermeshing rotary cutter or die elements between which the board is passed, the shafts of said rotary cutter or die elements being positively driven the one by the other through gear wheels, the shaft of the rotary cutter or die element which is driven by the shaft of the other element being adjustable away from and towards the other shaft, the drive between the driven gear wheel, and its shaft incorporating a coupling which allows of the radial adjustment of the shaft whilst maintaining constant the angular velocity of the two shafts.

The object of this invention is to provide a slotting machine or slotter incorporating a novel form of back lash free coupling for the purpose referred to.

The invention consists in a slotting machine or slotter of the type referred to for making boxes and the like from corrugated cardboard, in which there are two intermeshing rotary cutter or die elements between which the board is passed, the shafts of said rotary cutter or die elements being positively driven the one by the other through gear wheels, the shaft of the rotary cutter or die element which is driven by the shaft of the other element being adjustable away from and towards the other shaft, and the drive between the driven gear wheel and its shaft incorporating a coupling which allows of the radial adjustment of the shaft whilst maintaining constant the angular velocity of the two shafts, characterized in this that the said coupling is adjustably arranged to eliminate back-lash between its relatively moving parts and incorporates a three element transmission unit, the centre element spigotally supporting and being sandwiched between two outer elements and having four radial slots adjacent its periphery at 90° to one another, two stub shafts in the driven gear wheel engaging two in-line radial slots in one outer and the centre element, and two stub shafts in radial arm extensions of a hub secured on the end of the driven shaft engaging two in-line radial slots in the other outer element and the centre element, there being adjustable jack-screw linkages between the centre element and each of the outer elements of the transmission unit whereby the rotational alignment of the linked elements may be adjusted relative to one another so as to reduce the clearance between the working edges of the slots in the said linked elements and the engaging surfaces of the stub shafts.

Referring to the accompanying explanatory drawings:

FIGURE 1 is a sectional elevation showing the improved driving and interconnecting mechanism of the intermeshing cutter like elements between which the board blank is passed, FIGURE 2 is an end view looking from right to left of FIGURE 1, FIGURE 3 is a detail sectional view on the line 3—3 of FIGURE 2, FIGURE 4 is a detail sectional view on the line 4—4 of FIGURE 2, FIGURE 5 is a detail sectional view on the line 5—5 of FIGURE 1.

The pair of intermeshing rotary cutter or die elements $a$ and $b$ between which the board blank indicated at $c$ is passed are secured on parallel contra-rotating shafts $d$ and $e$ whose axes are parallel to the surface of the board $c$ and at right angles to the direction in which it is moving. The shaft $d$ is mounted at its opposite ends (one end only being shown in the drawings) in fixed journal bearings in the machine frame members as $f$. The gear wheel $g$ is keyed to and drives the shaft $d$ and is driven by the gear wheel $h$ which turns freely on an excentric tubular extension $i$ of a rotatable bush $j$ which has an excentric bore forming the journal bearing through which the shaft $e$ passes. The peripheral surface of the tubular extension $i$ has opposite excentricity to the bush $j$ so that the wheel $h$ remains in unchanged peripheral relationship to the gear wheel $g$. The gear wheel $h$ is operatively connected to the end of the shaft $e$ through an Oldham type coupling comprising three members $k$, $m$ and $n$, the parts $k$ and $m$ being interconnected by two stub shafts $o$ secured in the member $k$ and extending into in-line radial slots in the member $m$, and the member $n$ being interconnected with the member $m$ by stub shafts $p$ (FIGURE 5) which pass through in-line radial slots adjacent the peripheries of said members $m$ and $n$, such stub shafts $p$ being secured in the ends of a cross member $q$ which is keyed to the shaft $e$ having the rotary cutter or die element $b$ integrally therewith. There are four radial slots at 90° to one another adjacent the periphery of the centre member $m$. The three element transmission is freely supported by the engagement of the stub shafts in the radial slots. It will be appreciated that the driving connection between the gear wheel $h$ and the shaft $e$ allows of the shaft $e$ being adjusted away from or towards the axle $d$ whilst maintaining unchanged the positive driving connection between the wheels $g$ and $h$. By suitably turning the excentric bush $j$ the gap between the cutter elements $a$ and $b$ can be adjusted to suit the thickness of the material $c$ passing between the cutter elements. The Oldham type coupling comprising the three members $k$, $m$ and $n$ interconnected as before described with the members $h$ and q allow of relative movement between the gear wheel h and the shaft e whilst the wheel h and shaft e are rotating to turn the cutter elements.

The unit shown in FIGURE 3 can be used to adjust the angular relationship between the elements k and m, and the unit shown in FIGURE 4 can be used to adjust the angular relationship between the parts n and m in order to reduce the clearance between the working edges of the slots in the said elements and the engaging surfaces of the stub shafts.

It will be appreciated that there are excentric bushes as j at both ends of the shaft e but the shaft e may be driven at one end only.

Irrespective of changes in the relative positions of the axes of rotations of the driving and driven stub shafts o and p as a result of adjustment of the excentric bush j, the free gyratory motion of the transmission unit as the stub shafts o and p move in their slots during operation, ensures that the angular velocity of the two shafts d and e remains identical.

Each stub shaft o and p of the coupling may have a rolling contact bearing unit, such as a needle roller bearing, mounted thereon so that its outer race will roll freely in the transmission unit slots.

What is claimed is:

A slotting machine or slotter of the type referred to for making boxes and the like from corrugated cardboard, in which there are two intermeshing rotary cutter or die elements between which the board is passed, the shafts of said rotary cutter or die elements being positively driven the one by the other through gear wheels, the shaft of the rotary cutter or die element which is driven by the shaft of the other element being adjustable away from and towards the other shaft, and the drive between the driven gear wheel and its shaft incorporating a coupling which allows of the radial adjustment of the shaft whilst maintaining constant the angular velocity of the two shafts, characterized in this that the said coupling is adjustably arranged to eliminate back-lash between its relatively moving parts and incorporates a three element transmission unit, the centre element spigotally supporting and being sandwiched between two outer elements and having four radial slots adjacent its periphery at 90° to one another, two stub shafts in the driven gear wheel engaging two in-line radial slots in one outer and the centre element, and two stub shafts in radial arm extension of a hub secured on the end of the driven shaft engaging two in-line radial slots in the other outer element and the centre element, there being adjustable jack-screw linkages between the centre element and each of the outer elements of the transmission unit whereby the rotational alignment of the linked elements may be adjusted relative to one another so as to reduce the clearance between the working edges of the slots in the said linked elements and the engaging surfaces of the stub shafts.

References Cited in the file of this patent
UNITED STATES PATENTS

| | | |
|---|---|---|
| 2,259,441 | Fitchett | Oct. 21, 1941 |
| 2,674,942 | Rockstrom | Apr. 13, 1954 |